United States Patent
Kaczmar et al.

(10) Patent No.: US 10,677,142 B2
(45) Date of Patent: Jun. 9, 2020

(54) PARALLEL-FLOW IMMERSION HEAT EXCHANGER

(71) Applicant: GM GLOBAL TECHNOLOGY OPERATIONS LLC, Detroit, MI (US)

(72) Inventors: Michael P. Kaczmar, Farmington Hills, MI (US); Alan E. Bowler, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 247 days.

(21) Appl. No.: 15/435,963

(22) Filed: Feb. 17, 2017

(65) Prior Publication Data

US 2018/0238224 A1    Aug. 23, 2018

(51) Int. Cl.
| | |
|---|---|
| *F01P 11/08* | (2006.01) |
| *F01P 3/02* | (2006.01) |
| *F01M 5/00* | (2006.01) |
| *F28D 7/10* | (2006.01) |
| *F02F 7/00* | (2006.01) |
| *F01M 1/02* | (2006.01) |
| *F28F 21/08* | (2006.01) |
| *F28F 21/06* | (2006.01) |
| *F28F 27/02* | (2006.01) |
| *F01M 11/00* | (2006.01) |

(52) U.S. Cl.
CPC ............. *F01P 11/08* (2013.01); *F01M 1/02* (2013.01); *F01M 5/002* (2013.01); *F01P 3/02* (2013.01); *F02F 7/007* (2013.01); *F28D 7/106* (2013.01); *F28F 21/06* (2013.01); *F28F 21/084* (2013.01); *F28F 27/02* (2013.01); *F01M 2011/0025* (2013.01); *F01P 2003/021* (2013.01); *F01P 2025/40* (2013.01); *F16N 2250/08* (2013.01); *F28F 2255/16* (2013.01)

(58) Field of Classification Search
CPC .. F01M 1/02; F01M 2011/0025; F01M 5/002; F01M 11/0004; F01M 2005/004; F01M 2005/023; F01P 11/08; F01P 2003/021; F01P 2025/40; F01P 3/02; F01P 11/10; F02F 7/007; F16N 2250/08; F28D 7/106; F28D 7/103; F28D 7/10; F28D 7/0066; F28D 9/0093; F28D 7/00; F28D 7/0075; F28D 7/0083; F28F 21/06; F28F 21/084; F28F 2255/16; F28F 27/02; F28F 2270/00
USPC ......................................................... 165/141
See application file for complete search history.

(56) References Cited

U.S. PATENT DOCUMENTS 4,422,429 A * 12/1983 Reed .................. F02M 31/16
123/538
2017/0328245 A1* 11/2017 Kasperowitsch ...... F01M 5/001

* cited by examiner

*Primary Examiner* — Stephen K Cronin
*Assistant Examiner* — Ruben Picon-Feliciano
(74) *Attorney, Agent, or Firm* — Quinn IP Law

(57) ABSTRACT

A heat exchanger includes a heat exchanger body arranged along an axis and having an external surface in contact with a surrounding first fluid. The body defines a first fluid passage centered on and extending along the axis. The body also defines a second fluid passage extending parallel with respect to the axis and spaced away from the axis by a second passage distance, and a third fluid passage extending parallel with respect to the axis and spaced away from the axis by a third passage distance. The first, second, and third passages are parallel to one another, while the third passage distance is greater than the second passage distance. Each of the first and third passages is configured to accept a flow of a second fluid and the second fluid passage is configured to hold a volume of air to thermally insulate the first passage from the third passage.

10 Claims, 4 Drawing Sheets

US 10,677,142 B2

PARALLEL-FLOW IMMERSION HEAT EXCHANGER

INTRODUCTION

The present disclosure relates to a parallel-flow immersion heat exchanger.

A heat exchanger is a device used to transfer heat between one or more fluids. Heat exchangers are widely used in space heating, refrigeration, air conditioning, power stations, chemical and petrochemical plants, petroleum refineries, natural-gas, processing, and sewage treatment, etc. Heat exchangers typically known as radiators are also found in motor vehicles for cooling internal combustion engines. In such exchangers, a circulating engine coolant typically flows through radiator coils, while air flows past the coils to thereby remove heat from the engine coolant, while heating the incoming air.

Heat exchangers are typically classified according to their flow arrangement. In parallel-flow heat exchangers, the two fluids enter the exchanger at the same end, and travel in parallel to one another to the other side. In counter-flow heat exchangers, the fluids enter the exchanger from opposite ends. In cross-flow heat exchangers, the fluids travel roughly perpendicular to one another through the exchanger. For efficiency, heat exchangers are designed to maximize the surface area of the wall between the two fluids, while minimizing resistance to fluid flow through the exchanger.

SUMMARY

One embodiment of the disclosure is directed to a heat exchanger that includes a heat exchanger body arranged along an axis and having an external surface in contact with a surrounding first fluid, such as engine oil. The heat exchanger body defines a first fluid passage centered on and extending along the axis. The heat exchanger body also defines at least one second fluid passage extending parallel with respect to the axis and spaced away from the axis by a second passage distance, and at least one third fluid passage extending parallel with respect to the axis and spaced away from the axis by a third passage distance. The first fluid passage, the at least one second fluid passage, and the at least one third fluid passage are parallel to one another, and the third passage distance is greater than the second passage distance. Each of the first and the at least one third fluid passages is configured to accept a flow of a second fluid, such as engine coolant, and the at least one second fluid passage is configured to hold a volume of air to thereby thermally insulate the first fluid passage from the at least one third fluid passage.

The heat exchanger body may define a first end and an opposing second end. The heat exchanger may also include a first sealing element and a second sealing element. The heat exchanger may additionally include a first end cap sealed via the first sealing element to the first end and a second end cap sealed to the second end via the second sealing element.

The heat exchanger may additionally include an inlet pipe in fluid communication with the first fluid passage and fixed to the first end cap. The heat exchanger may include a first outlet pipe in fluid communication with the first fluid passage and fixed to the second end cap. Furthermore, the heat exchanger may include a second outlet pipe in fluid communication with the at least one third fluid passage and fixed to the second end cap.

The inlet pipe may be integrally formed with the first end cap, while the first outlet pipe and the second outlet pipe are integrally formed with the second end cap and.

The heat exchanger body may be constructed from aluminum and the first and second end caps may be constructed either from aluminum or from injection molded plastic.

The first end cap may be fluidly sealed to the sump via a third sealing element and the second end cap may be fluidly sealed to the sump via a fourth sealing element.

The heat exchanger may additionally include a fluid control device configured to regulate a flow of the second fluid through the first fluid passage. For example, either the heat exchanger body or the first end cap may define an orifice operating as the fluid control device.

The fluid control device may include a valve configured to selectively restrict the flow of the second fluid through the first fluid passage.

The engine may also include a temperature sensor configured to detect a temperature of the oil in the sump.

The engine may additionally include an electronic controller in communication with each of the valve and the temperature sensor. In such a case, the controller may be configured to regulate operation of the valve in response to the temperature detected by the temperature sensor.

The at least one second fluid passage may include a plurality of second fluid passages evenly spaced on a second pitch circle, while the at least one third fluid passage may include a plurality of third fluid passages evenly spaced on a third pitch circle.

The external surface of the heat exchanger body may define a plurality of ribs configured to maximize an area of the external surface. Each of the plurality of ribs may be arranged parallel to the axis.

Another embodiment of the present disclosure is directed to an internal combustion engine having a sump, where the heat exchanger as described above is mounted for cooling engine oil via a circulating engine coolant.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
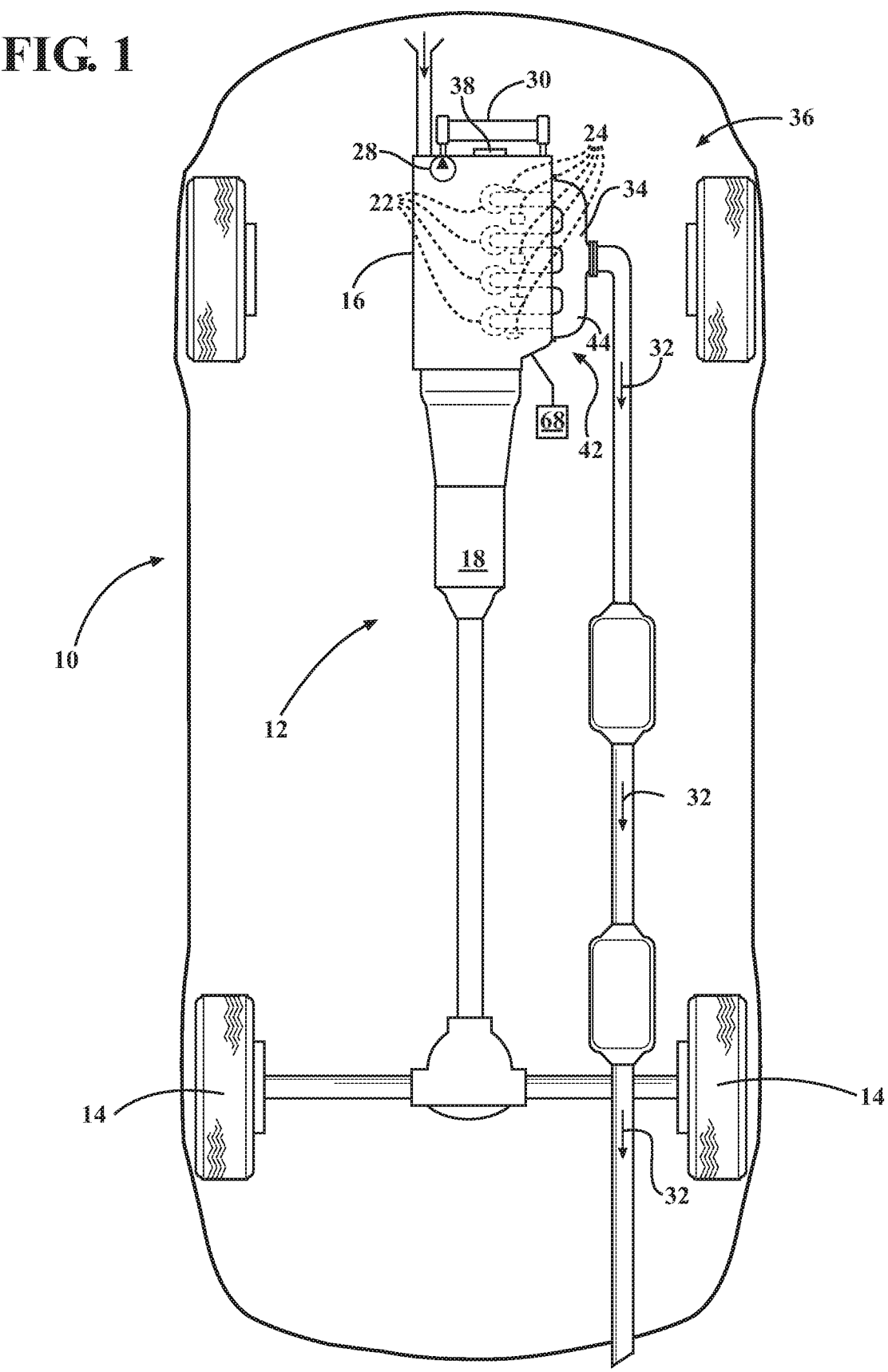
FIG. 1 is a schematic depiction of a vehicle having an internal combustion engine, according to the disclosure.

Referring to the drawings, wherein like reference numbers correspond to like or similar components throughout the several figures, FIG. 1 illustrates a vehicle 10 employing a powertrain 12 for propulsion thereof via driven wheels 14. As shown, the powertrain 12 includes an internal combustion engine 16, such as a spark- or compression-ignition type, and a transmission assembly 18 operatively connected thereto. The powertrain 12 may also include one or more electric motor/generators, none of which are shown, but the existence of which may be envisioned by those skilled in the art.

Figure 2:
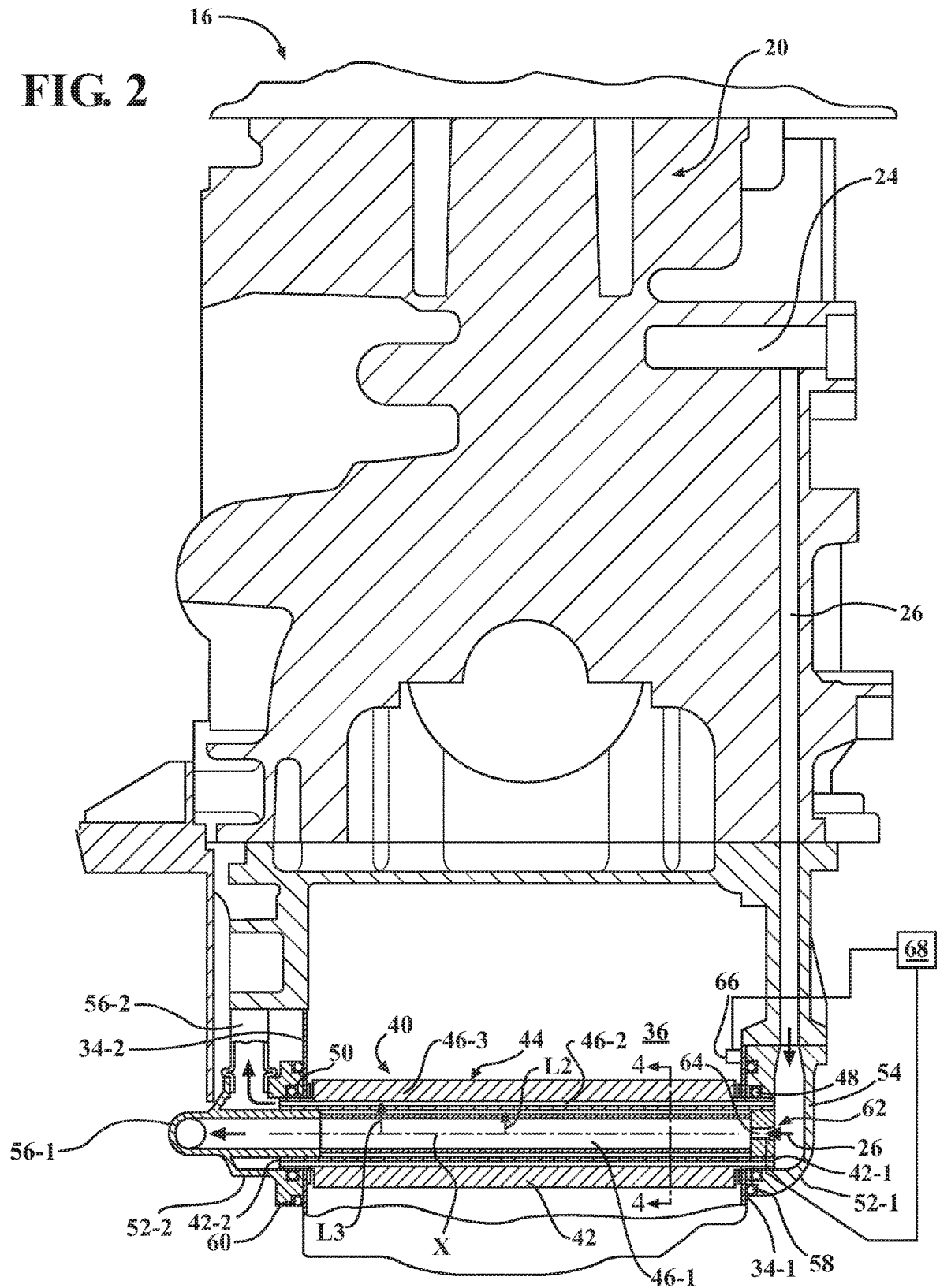
FIG. 2 is a schematic partially cross-sectional plan view of the engine shown in FIG. 1 having a parallel-flow immersion heat exchanger, according to the disclosure.
Figure 3:
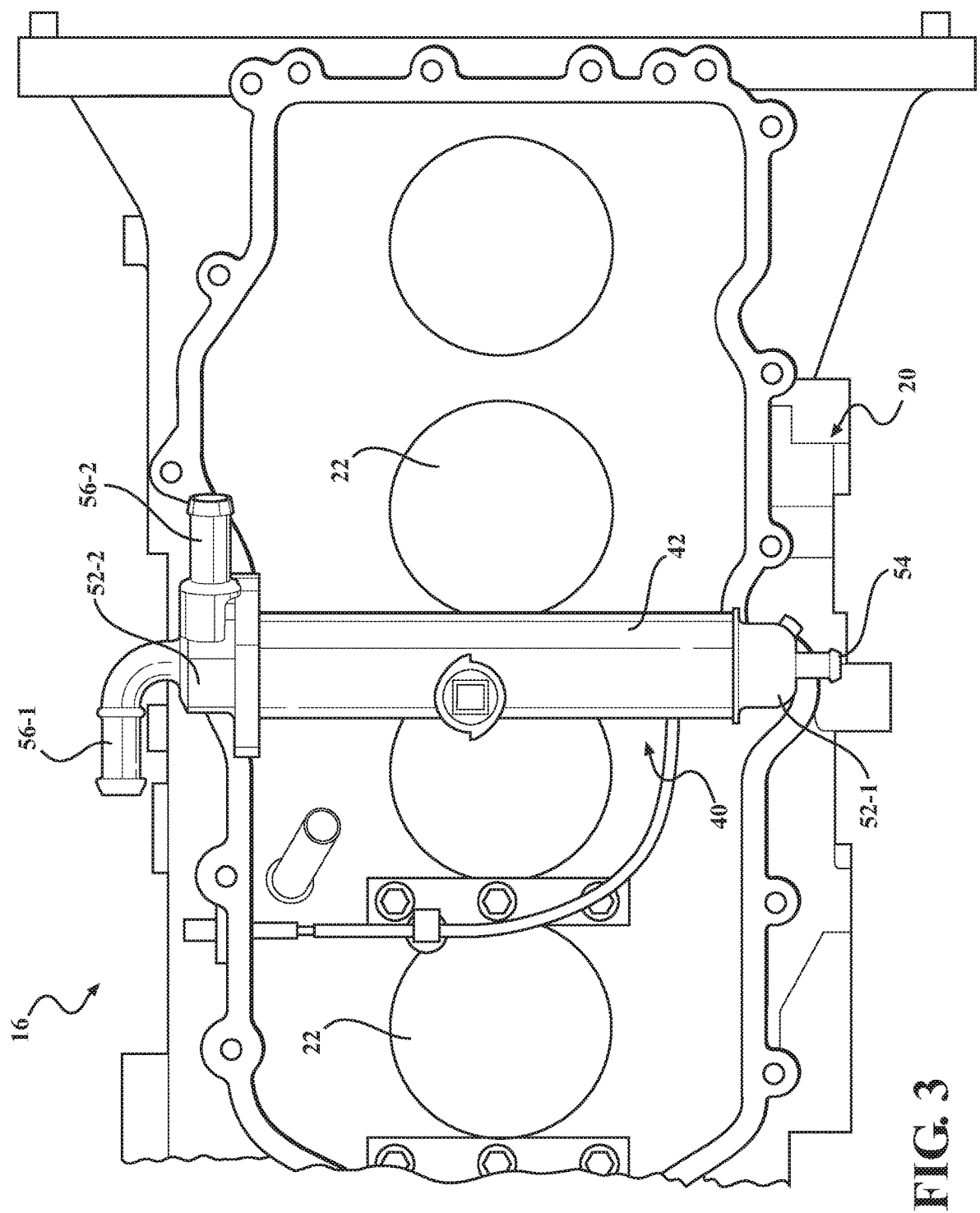
FIG. 3 is a schematic partial bottom view of the engine with the parallel-flow immersion heat exchanger shown in FIG. 2.

As shown, the engine 16 includes a cylinder block 20 defining a plurality of cylinders 22. As shown in FIGS. 2-3, the cylinder block 20 also defines a coolant jacket 24 configured to circulate therethrough an engine coolant 26, such as a specially formulated chemical compound mixed with water. The engine coolant 26 is typically circulated throughout the engine 16 via a fluid pump 28 (shown in FIG. 1). The engine coolant 26 is typically passed through a heat exchanger 30, such as an air-to-coolant radiator, for removing heat energy that was carried away from the engine 16. After being passed through the radiator 30, the engine coolant may be returned to the coolant jacket 24 via the fluid pump 28. Each cylinder 22 includes a piston (not shown) configured to reciprocate therein. Each of the cylinders 22 receives fuel and air for subsequent combustion inside a combustion chamber (not shown) established at the top of a respective piston.

The engine 16 also includes a crankshaft (not shown) configured to rotate within the cylinder block 20. The crankshaft is rotated by the pistons and generates a torque output of the engine 16 as a result of an appropriately proportioned fuel-air mixture being burned in the respective combustion chambers. After the fuel-air mixture is burned inside a specific combustion chamber, the reciprocating motion of a particular piston serves to exhaust post-combustion gasses 32 from the respective cylinder 22. As a by-product of generating torque, the engine 16 typically generates the heat energy that is subsequently removed and transferred or distributed by the engine coolant 26. Although an in-line four-cylinder engine is shown, nothing precludes the present disclosure from being applied to an engine having a different number and/or arrangement of cylinders.

The engine 16 also includes a sump 34 mounted to the cylinder block 20 and configured to hold engine oil 36. Engine oil 36 is generally derived from petroleum-based and non-petroleum synthesized chemical compounds and mainly use base oils composed of hydrocarbons that are blended with chemical additives to minimize friction and wear of engine internal components. As shown in FIG. 1, an oil pump 38 may be mounted to the cylinder block 20. The oil pump 38 may collect the engine oil 36 from the sump 34 for circulation throughout the engine 16 to cool and/or lubricate critical areas and components, such as the combustion chambers and various bearings. Following such circulation throughout the engine 16, the engine oil 36 is returned to the sump 34 by gravity.

As shown in FIGS. 2-3, a parallel-flow immersion heat exchanger 40 is arranged inside and fixedly mounted to the sump 34 within the engine oil 36. The heat exchanger 40 is configured to cool the engine oil 36 being held by the sump 34 via the engine coolant 26. Although the remainder of the present disclosure concentrates on mounting and use of the heat exchanger 40 in an internal combustion engine, nothing precludes the disclosed heat exchanger from being employed in various industrial or construction applications, wherever heat transfer between non-mixable fluids is desired via a heat exchanger immersed in and surrounded by a body of one fluid and having a second fluid passed therethrough.

Figure 4:
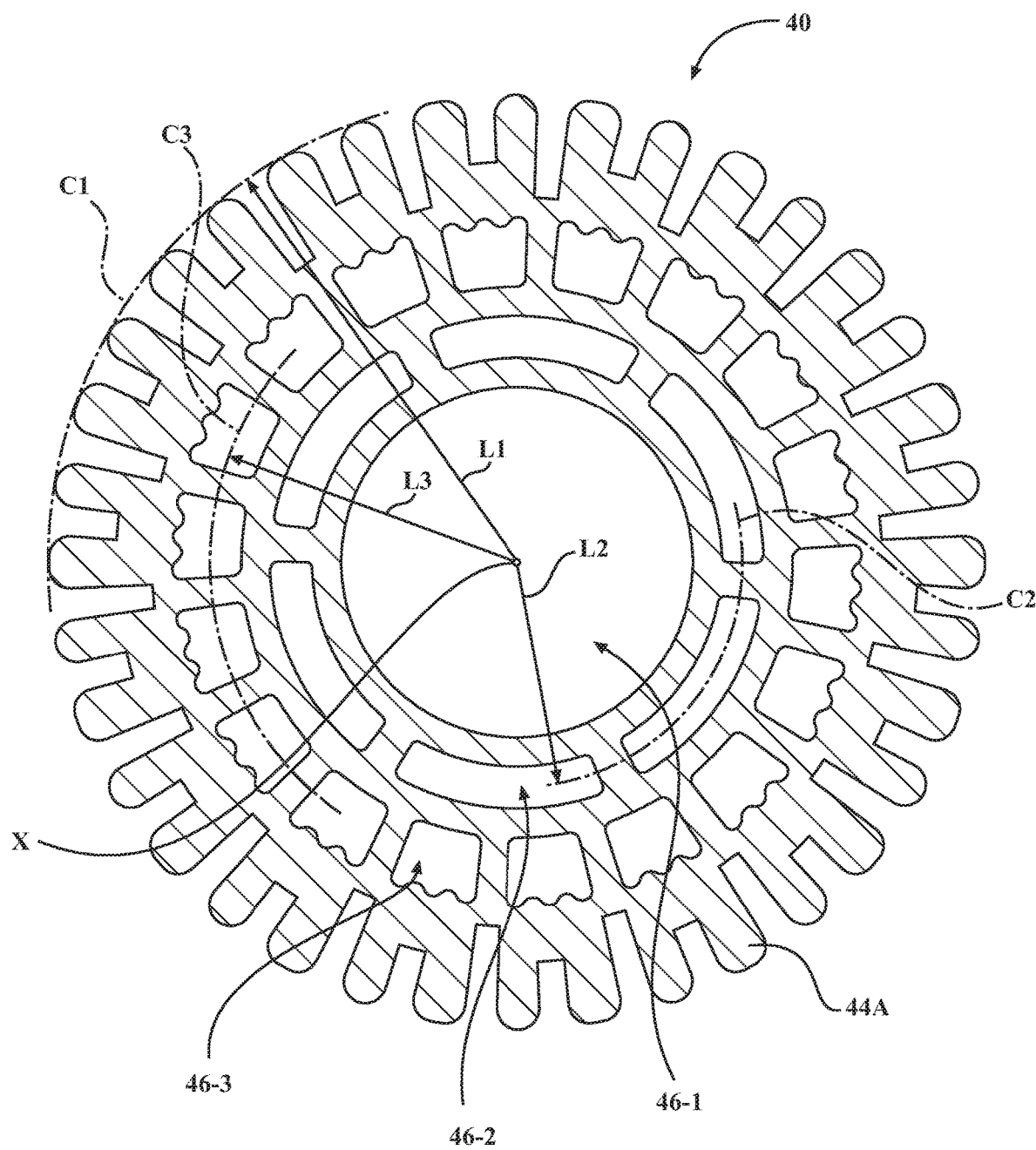
FIG. 4 is a schematic cross-sectional view of the parallel-flow immersion heat exchanger shown in FIGS. 2 and 3, according to the disclosure.

The heat exchanger 40 includes a heat exchanger body 42 arranged along an axis X. The heat exchanger body 42 has an external surface 44 in contact with the engine oil 36. The external surface 44 may have a generally circular shape in a cross-sectional view 4-4 shown in FIG. 4, or a different shape, such as square or rectangular, as desired. As shown in FIG. 4, the external surface 44 may also define a plurality of ribs 44A configured to increase an area of the external surface in contact with the engine oil 36 and maximize heat transfer from the oil to the heat exchanger body 42. Each of the plurality of ribs 44A may be arranged parallel to the axis X. Additionally, the plurality of ribs 44A may be generally arranged at a distance L1 from the axis X or, if the external surface 44 has a circular shape in the cross-sectional view, on a first pitch circle C1, as shown in FIG. 4. Although not shown, a plurality of annular ribs may be arranged on the external surface 44 and spaced along the heat exchanger body 42.

The heat exchanger body 42 defines a first or central fluid passage 46-1 centered on and extending along the axis X. The first fluid passage 46-1 may have a substantially circular cross-section. The heat exchanger body 42 also defines one or more second or intermediate fluid passages 46-2 extending parallel with respect to the axis X and spaced away from the axis X by a second passage distance L2. The second fluid passages 46-2 may be arranged on a second pitch circle C2 concentric with the central passage 46-1. Accordingly, the plurality of second fluid passages 46-2 may be arranged in a substantially circular pattern. The heat exchanger body 42 also defines one or more third or outer fluid passages 46-3 extending parallel with respect to the axis X and spaced away from the axis X by a third passage distance L3. The fluid passages 46-3 may be arranged on a third pitch circle C3 concentric with the central passage 46-1. As such, similar to the second fluid passages 46-2, a plurality of third fluid passages 46-3 may be arranged in a substantially circular pattern. In the embodiment having a plurality of the second fluid passages 46-2, the second fluid passages may be evenly spaced on the second pitch circle C2. Additionally, in the embodiment having a plurality of the third fluid passages 46-3, the third fluid passages may be evenly spaced on the third pitch circle C3.

The first fluid passage 46-1, the second fluid passages 46-2, and the third fluid passages 46-3 are generally parallel to one another. Furthermore, the third passage distance L3 is greater than the second passage distance L2, such that, when seen in a cross-sectional view, the second fluid passages 46-2 are arranged between or intermediate the first fluid passage 46-1 and the third fluid passages 46-3. Analogously, the third pitch circle C3 is intended to be greater than the second pitch circle C2. Each of the first fluid passage 46-1 and the third fluid passages 46-3 is configured to accept a flow of the coolant 26 from the fluid pump 28. The second fluid passages 46-2, on the other hand, are configured to hold a volume of air, to thereby thermally insulate the first fluid passage 46-1 from the third fluid passages 46-3.

As shown, the heat exchanger body 42 defines a first end 42-1 and an opposing second end 42-2. The heat exchanger 40 also includes a first sealing element 48 and a second sealing element 50. The heat exchanger 40 additionally includes a first end cap 52-1 sealed via the first sealing element 48 to the first end 42-1 and a second end cap 52-2 sealed to the second end 42-2 via the second sealing element 50. The heat exchanger body 42 may be constructed from aluminum. The first and second end caps 52-1, 52-2 may be constructed either from aluminum or from injection molded plastic. The heat exchanger 40 additionally includes an inlet pipe 54 in fluid communication with the first fluid passage 46-1 and fixed to the first end cap 52-1. The heat exchanger 40 further includes a first outlet pipe 56-1 in fluid communication with the first fluid passage 46-1 and fixed to the second end cap 52-2, and a second outlet pipe 56-2 in fluid communication with the third fluid passages 46-3 and fixed to the second end cap 52-2. As shown in FIG. 3, the inlet pipe 54 may be integrally formed with the first end cap 52-1, and the first and second outlet pipes 56-1, 56-2 may be integrally formed with the second end cap 52-2.

With continued reference to FIG. 3, the first end cap 52-1 may be fluidly sealed to the sump 34 at a first sump wall 34-1 via a third sealing element 58 and the second end cap 52-2 may be fluidly sealed to the sump at a second sump wall 34-2 via a fourth sealing element 60. The heat exchanger 40 may additionally include a fluid control device 62 configured to regulate a flow of the engine coolant 26 through the first fluid passage 46-1. The fluid control device 62 may be an orifice defined either by the heat exchanger body 42 or by one of the first and the second end caps 52-1, 52-2. Alternatively, the orifice type of a fluid control device 62 may be a separate component arranged in one of the above elements of the heat exchanger 40. The fluid control device 62 may include a variable position valve 64 configured to selectively restrict the flow of the coolant 26 through the first fluid passage 46-1.

As shown in FIG. 2, the engine 16 may also include a temperature sensor 66 configured to detect a temperature of the engine oil 36 in the sump 34. A programmable electronic controller 68 (shown in FIGS. 1 and 2) may be arranged in communication with each of the valve 64 and the temperature sensor 66. The controller 68 may thus be configured to regulate operation of the valve 64 in response to the temperature detected by the temperature sensor 66. The controller 68 may also be configured to regulate circulation of engine coolant 26 via controlling operation of the fluid pump 28. In general, the controller 68 may be a dedicated controller for the engine 16, a controller for the powertrain 12, or a central processing unit for the entire vehicle 10. The controller 68 includes a memory, at least some of which is tangible and non-transitory. The memory may be a recordable medium that participates in providing computer-readable data or process instructions. Such a medium may take many forms, including but not limited to non-volatile media and volatile media.

Non-volatile media in the controller 68 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 68 may also include a floppy disk, a flexible disk, hard disk, magnetic tape, other magnetic medium, a CD-ROM, DVD, other optical medium, etc. The controller 68 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 68 or accessible thereby may be stored in the memory and automatically executed to provide the required functionality.

The controller 68 may control the valve 64 to apportion the flow of engine coolant 26 through the heat exchanger 40 such that the engine oil 36 receives appropriate cooling during operation of the engine 16. The valve 64 may also be used to control the amount of engine coolant 26 passing through the first fluid passage 46-1 and exiting the heat exchanger 40 via the first outlet pipe 56-1, for example to a separate heat exchanger (not shown) that uses the engine coolant to cool transmission fluid of the transmission assembly 18. Such use of the engine coolant 26 passing through the first fluid passage 46-1 is enabled by the thermal insulation of the first fluid passage from the third fluid passages 46-3 via the volume of air within the second fluid passages 46-2.

Because the engine coolant 26 flowing through the first outlet pipe 56-1 has not received significant heat transfer from the engine oil 36, the subject first outlet pipe flow of engine coolant may be used for cooling other components or assemblies downstream of the heat exchanger 40. On the other hand, the heated coolant 26 flowing through the third fluid passages 46-3 and collecting heat energy from the engine oil 36 may be returned from the second outlet pipe 56-2 to the radiator 30 for removing heat therefrom. Accordingly, the heat exchanger 40 may be employed as part of a cooling system for the powertrain 12 of the vehicle 10. Overall, however, the heat exchanger 40 may be used in an application where an immersed heat exchanger may be beneficial in controlling temperature of a surrounding fluid.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:
1. An internal combustion engine comprising:
a cylinder block defining a cylinder and a coolant jacket;
a fluid pump configured to supply a coolant to the coolant jacket;
a sump mounted to the cylinder block and configured to hold engine oil;
a heat exchanger fixed inside the sump, the heat exchanger including a heat exchanger body arranged along an axis, having an external surface in contact with the engine oil, and defining:
a first fluid passage centered on and extending along the axis;
at least one second fluid passage extending parallel with respect to the axis and spaced away from the axis by a second passage distance;
at least one third fluid passage extending parallel with respect to the axis and spaced away from the axis by a third passage distance;
wherein the first fluid passage, the at least one second fluid passage, and the at least one third fluid passage are parallel to one another, and the third passage distance is greater than the second passage distance; and
wherein each of the first and the at least one third fluid passages is configured to accept a flow of the coolant from the fluid pump and the at least one second fluid passage is configured to hold a volume of air to thereby thermally insulate the first fluid passage from the at least one third fluid passage.

2. The engine of claim 1, wherein the heat exchanger body defines a first end and an opposing second end, and wherein the heat exchanger additionally includes a first sealing element, a second sealing element, a first end cap sealed via the first sealing element to the first end, and a second end cap sealed to the second end via the second sealing element.

3. The engine of claim 2, wherein the heat exchanger additionally includes an inlet pipe in fluid communication with the first fluid passage and fixed to the first end cap, a first outlet pipe in fluid communication with the first fluid passage and fixed to the second end cap, and a second outlet pipe in fluid communication with the at least one third fluid passage and fixed to the second end cap.

4. The engine of claim 2, wherein the heat exchanger body is constructed from aluminum and the first and second end caps are constructed from one of aluminum and injection molded plastic.

5. The engine of claim 2, wherein the first end cap is fluidly sealed to the sump via a third sealing element and the second end cap is fluidly sealed to the sump via a fourth sealing element.

6. The engine of claim 1, wherein the heat exchanger additionally includes a fluid control device configured to regulate a flow of the coolant through the first fluid passage.

7. The engine of claim 6, wherein the fluid control device includes a valve configured to selectively restrict the flow of the coolant through the first fluid passage.

8. The engine of claim 7, further comprising a temperature sensor configured to detect a temperature of the oil in the sump.

9. The engine of claim 8, further comprising an electronic controller in communication with each of the valve and the temperature sensor, and configured to regulate operation of the valve in response to the temperature detected by the temperature sensor.

10. The engine of claim 1, wherein the external surface of the heat exchanger body defines a plurality of ribs, and wherein each of the plurality of ribs is arranged parallel to the axis.

* * * * *